United States Patent
Matsuyama et al.

(10) Patent No.: US 9,391,347 B2
(45) Date of Patent: Jul. 12, 2016

(54) CELL CONNECTION CONTROL DEVICE

(71) Applicant: NISSAN MOTOR CO., LTD., Yokohama-shi, Kanagawa (JP)

(72) Inventors: Chiduru Matsuyama, Sagamihara (JP); Yukari Tsukamoto, Sagamihara (JP); Takeshi Fujita, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 217 days.

(21) Appl. No.: 14/364,560

(22) PCT Filed: Nov. 5, 2012

(86) PCT No.: PCT/JP2012/078598
§ 371 (c)(1),
(2) Date: Jun. 11, 2014

(87) PCT Pub. No.: WO2013/088859
PCT Pub. Date: Jun. 20, 2013

(65) Prior Publication Data
US 2014/0349150 A1    Nov. 27, 2014

(30) Foreign Application Priority Data

Dec. 12, 2011  (JP) ................... 2011-270827
Oct. 4, 2012    (JP) ................... 2012-222080

(51) Int. Cl.
*H01M 10/42*    (2006.01)
*H01M 10/48*    (2006.01)
*H02J 7/00*      (2006.01)
*H02J 1/10*      (2006.01)
*H02J 1/00*      (2006.01)

(52) U.S. Cl.
CPC ........ *H01M 10/4257* (2013.01); *H01M 10/482* (2013.01); *H02J 7/0029* (2013.01); *H01M 2010/4271* (2013.01); *H02J 1/10* (2013.01); *H02J 2001/008* (2013.01); *H02J 2007/0039* (2013.01)

(58) Field of Classification Search
None
See application file for complete search history.

(56) References Cited

U.S. PATENT DOCUMENTS

2006/0284597 A1    12/2006    Takahashi

FOREIGN PATENT DOCUMENTS

| JP | 2001-309567 A | 11/2001 |
|----|---------------|---------|
| JP | 2006-345660 A | 12/2006 |
| JP | 2009-284606 A | 12/2009 |
| JP | 2010-220280 A | 9/2010  |

*Primary Examiner* — Patrick Ryan
*Assistant Examiner* — Wyatt McConnell
(74) *Attorney, Agent, or Firm* — Foley & Lardner LLP

(57) ABSTRACT

When connecting a plurality of cells in parallel, an operation to calculate an inrush current flowing when a pair of cells are selected from the cells for the parallel-connection and parallel-connected for all cell combinations. A cell combination, whose inrush current is the largest in the cell combinations which are judged that the calculated inrush current is less than or equal to a predetermined upper limit current value, is set as a cell combination to parallel-connect the cells.

8 Claims, 5 Drawing Sheets

CELL CONNECTION CONTROL DEVICE

TECHNICAL FIELD

The present invention relates to a cell connection control device.

BACKGROUND ART

There has been known a technique in which when connecting a plurality of battery packs in parallel, in a case where there is a voltage difference between each of cells, in order to prevent an excessive inrush current from flowing from a higher voltage cell to a lower voltage cell, the cells are connected in parallel after the lower voltage cell is charged so that potential difference becomes a predetermined level or less (see e.g. Patent Document 1).

Here, when the excessive inrush current flows in the cell upon parallel-connecting the plurality of cells, there is a possibility that life of the battery (the cell) will be shortened and/or heat generation of the battery (the cell) will occur. Thus, while it is required that the excessive inrush current be surely prevented from flowing in the cell, a method of parallel-connecting the plurality of cells in a short time is desired.

However, in the case of a method disclosed in the Patent Document 1, since the lower voltage cell is charged and its voltage is made equal to voltage of the higher voltage cell, a process (an operation) to connect the cell to a charger and also a process (an operation) to charge the cell are needed, then there arises a problem of taking time required to complete the parallel-connection of the cells.

CITATION LIST

Patent Document

Patent Document 1: Japanese Patent Provisional Publication Tokkai No. 2001-309567

SUMMARY OF THE INVENTION

An object of the present invention is to provide a cell connection control device that is capable of connecting the cells in parallel in a short time while suppressing the excessive inrush current when parallel-connecting the plurality of cells.

In the present invention, when connecting the plurality of cells in parallel, an operation to calculate the inrush current flowing when the pair of cells are selected from the cells for the parallel-connection and parallel-connected for all cell combinations, and a cell combination, whose inrush current is the largest in the cell combinations which are judged that the calculated inrush current is less than or equal to a predetermined upper limit current value, is set as a cell combination to parallel-connect the cells. With this operation, the above problem can be solved.

According to the present invention, when connecting the plurality of cells in parallel, the operation to calculate the inrush current $I_{pq}$ of the pair of cells is performed for all cell combinations to parallel-connect the cells, and the cell combination, whose inrush current is the largest in the cell combinations which are judged that the calculated inrush current is less than or equal to the predetermined upper limit current value, is selected or sampled, thereby setting a proper cell combination to connect the cells in parallel. It is therefore possible to parallel-connect the cells in a short time without making an unnecessary attempt to parallel-connect the cells while suppressing the excessive inrush current.

DESCRIPTION OF EMBODIMENTS

In the following description, embodiments of the present invention will be explained on the basis of the drawings.

First Embodiment

Figure 1:
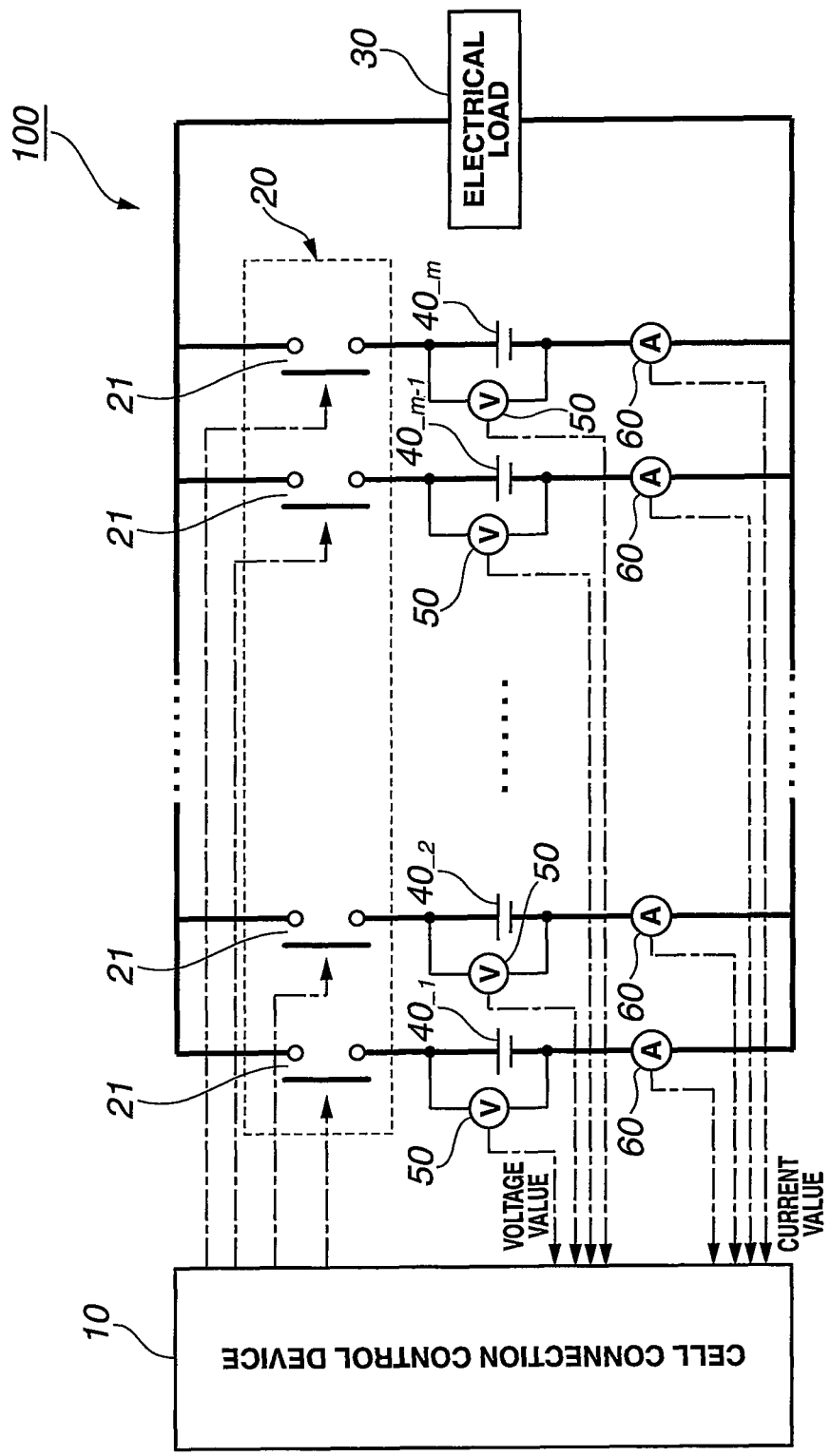
FIG. 1 is a block diagram showing a cell connection system according to the present embodiment.

FIG. 1 is a block diagram showing a cell connection system according to the present embodiment. As shown in FIG. 1, a cell connection system 100 of the present embodiment is a system that connects n cells in parallel from m cells previously prepared (where, n≤m). The cell connection system 100 has a cell connection control device 10, a cell connection device (or a cell connection unit) 20, a voltage sensor 50 and a current sensor 60 which detect voltage and current of each cell. Parallel-connected cells work as a battery module that supplies power to an electrical load 30.

The cell connection control device 10 is a device that sets a cell combination to parallel-connect the cells from the plurality of cells. More specifically, the cell connection control device 10 performs an operation to select a pair of cells from the cells for the parallel-connection of the cells and to calculate an inrush current that is current flowing between the selected pair of cells when parallel-connected, for all cell combinations for the parallel-connection of the cells, then on the basis of the calculation result, sets the cell combination to parallel-connect the cells.

Here, although the inrush current is calculated on the basis of voltage and current of each cell detected by the voltage sensor 50 and the current sensor 60, its calculating method will be described later.

The cell connection unit 20 is a unit that connects the cells in parallel. More specifically, the cell connection unit 20 parallel-connects the pair of cells that form the cell combination for the parallel-connection of the cells, which are set by the cell connection control device 10, through a switch 21 such as a relay.

Next, a specific method of the present embodiment which sets the cell combination to parallel-connect the cells from the plurality of cells will be explained.

Figure 2:
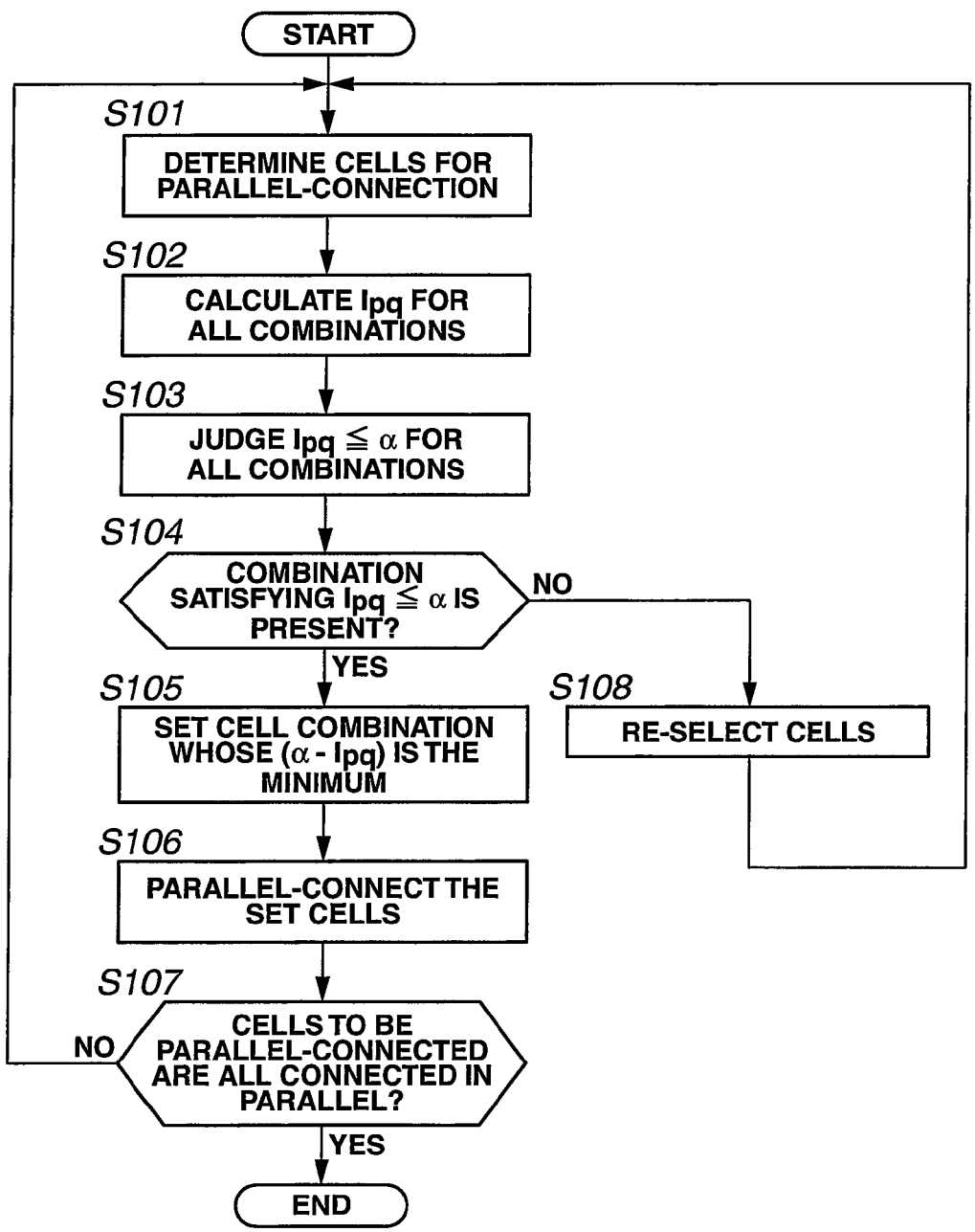
FIG. 2 is a flow chart showing a cell parallel connection method of a first embodiment.

FIG. 2 is a flow chart showing an example of operation in which n cells are previously sampled or selected from m cells provided in the cell connection system 100, then the selected n cells are parallel-connected. Here, all the switches 21 of the cell connection unit 20 are in an OFF state (a state in which no cells are connected to each other) at a start-up of the flow chart.

In the following description, the case where n cells previously sampled or selected from a plurality of cells whose number is m are parallel-connected will be explained as an example. Here, as the number of the selected cells, for instance, a predetermined number of the cells could be previously set, or the required number of cells to realize a desired battery capacity of the battery module might be set according to the desired battery capacity.

First, at step S101, the cell connection control device 10 determines the previously selected n cells as a plurality of cells for the parallel-connection of the cells. In the present embodiment, from these cells determined here, the cell combination to parallel-connect the cells is set. Further, at this time, an operation in which voltages and internal resistances of the all determined cells are obtained is performed by the cell connection control device 10. As a method of obtaining the voltage and the internal resistance of the cell, for instance, an operator previously measures the voltage and the internal resistance of the cell by a tester etc. and inputs them in the cell connection control device 10, then the voltage and the internal resistance can be obtained from these input values. Or alternatively, the cell connection control device 10 previously stores the internal resistance that is calculated from the voltage and the current of the cell detected during an ON state of the switch 21 of the cell connection unit 20, then by reading this stored internal resistance and the voltage detected by the voltage sensor 50, of each cell, the voltage and the internal resistance can be obtained.

At step S102, the cell connection control device 10 performs an operation to calculate an inrush current $I_{pq}$ flowing when the pair of cells are parallel-connected, for all combinations of the cells determined at step S101. More specifically, the cell connection control device 10 performs an operation to select the pair of cells from the cells determined at step S101 and to calculate the inrush current $I_{pq}$ flowing between the selected pair of cells when parallel-connected, for all the combinations of the cells determined at step S101. Here, the inrush current $I_{pq}$ is calculated according to the following expression (1).

$$I_{pq}=\Delta V/R \quad (1)$$

In the expression (1), $\Delta V$ is a voltage difference between the pair of cells, R is a resistance in a parallel circuit when the pair of cells are parallel-connected. Here, in a case where the pair of cells having potential difference are parallel-connected, the resistance in the parallel circuit (in a closed loop formed by the parallel circuit) is a value obtained by adding the internal resistance of each cell. For instance, if the internal resistances of the pair of cells are $R_p$ and $R_q$, the resistance R in the parallel circuit is $R_p+R_q$ ($R=R_p+R_q$). In the present embodiment, for instance, as an example, when four cells (cells A, B, C and D) are determined at step S101, in this case, the cell connection control device 10 performs the operation to calculate the inrush current $I_{pq}$ when each pair of cells is parallel-connected, for six pairs of cells of A-B, A-C, A-D, B-C, B-D and C-D which are all combinations of the four cells.

At step S103, the cell connection control device 10 judges whether the inrush current $I_{pq}$ calculated at step S102 is less than or equal to a predetermined upper limit current value $\alpha$ or not, for all the cell combinations which have undergone the calculation of the inrush current $I_{pq}$. Regarding the predetermined upper limit current value $\alpha$, it could be a maximum amount of the current that can be flowed in the cell. For instance, the upper limit current value $\alpha$ can be determined according to the battery capacity etc. In the case of the four cells A, B, C and D as the same example as the above, the cell connection control device 10 judges whether the calculated inrush current $I_{pq}$ is less than or equal to the upper limit current value $\alpha$ or not, for the six pairs of cells of A-B, A-C, A-D, B-C, B-D and C-D.

At step S104, the cell connection control device 10 judges, from the judgment result at step S103, whether the cell combination whose inrush current $I_{pq}$ is less than or equal to the upper limit current value $\alpha$ is present or not. Then, when judged that at least one cell combination whose inrush current $I_{pq}$ is less than or equal to the upper limit current value $\alpha$ is present, the routine proceeds to step S105. On the other hand, when judged that cell combination whose inrush current $I_{pq}$ is less than or equal to the upper limit current value $\alpha$ is not present, the routine proceeds to step S108.

When judged that the cell combination whose inrush current $I_{pq}$ is less than or equal to the upper limit current value $\alpha$ is present at step S104, the routine proceeds to step S105, and at step S105, the cell combination to parallel-connect the cells is set. More specifically, the cell connection control device 10 calculates a difference ($\alpha-I_{pq}$) between the upper limit current value $\alpha$ and the inrush current $I_{pq}$, for all the cell combinations whose inrush current $I_{pq}$ is less than or equal to the upper limit current value $\alpha$. Subsequently, the cell connection control device 10 compares a magnitude of the calculated difference ($\alpha-I_{pq}$) of each cell combination, and selects the cell combination whose difference ($\alpha-I_{pq}$) is the minimum value, then sets the selected cell combination as the cell combination to parallel-connect the cells. Here, the cell combination whose difference ($\alpha-I_{pq}$) is the minimum value is a cell combination whose inrush current $I_{pq}$ is the largest in the cell combinations which are judged that the inrush current $I_{pq}$ is less than or equal to the upper limit current value $\alpha$.

At step S106, an operation in which the pair of cells forming the cell combination set at step S105 are parallel-connected is performed. First, the cell connection control device 10 sends a signal to the cell connection unit 20 so as to parallel-connect the pair of cells set as the cell combination to parallel-connect the cells. The cell connection unit 20 receives the signal from the cell connection control device 10 then connects the pair of cells in parallel. As a method of connecting the cells in parallel, for instance, it could be a parallel-connection method in which the pair of cells are electrically connected through the switch 21 by the cell connection unit 20.

At step S107, the cell connection control device 10 judges whether or not the cells corresponding to the number of the cells to be parallel-connected are all connected in parallel. For instance, in the present embodiment, when intending to parallel-connect n cells, the cell connection control device 10 judges whether or not the n cells are all parallel-connected. That is, the cell connection control device 10 judges whether or not one battery module is formed by the parallel-connection of the n cells. Then, when judged that the cells to be parallel-connected are not all connected in parallel, in order to perform an operation to further parallel-connect the cells, the routine returns to step S101. On the other hand, when judged that the cells to be parallel-connected are all connected in parallel, the cell connection control device 10 performs an operation to finish the cell connection control, and the present operation is terminated.

When judged that the cells to be parallel-connected are not all connected in parallel at step S107, the routine returns to step S101, and the determination of the cells for the parallel-connection is performed again, and also the voltage and the internal resistance of the determined cells are obtained. Here, upon the determination of the cells, in a case where the cell pair (cell-set) that has already been connected in parallel exists, the determination of the cells for the parallel-connection is performed with the cell pair (the cell-set) treated as one cell, then the voltage and the internal resistance of the determined cells are obtained. When explaining the four cells (n=4) A, B, C and D as the same example as the above, in a case where the cell A and the cell B are already parallel-connected then the cell pair (the cell-set) A-B exists, the cell pair A-B is treated as one cell, and three of the cell pair A-B, the cell C and the cell D are determined as the cells for the parallel-connection of the cells. At this time, the voltage and the internal resistance of each of the cell and the cell pair are detected.

Next, the routine proceeds to step S102. Then, as same as the above-mentioned step S102, the operation to calculate the inrush current $I_{pq}$ flowing when the pair of cells are parallel-connected is performed for all the combinations of the cells determined at step S101. Here, the already-parallel-connected cell pair is treated as one cell, and the calculation of the inrush current $I_{pq}$ is performed for all the combinations of the cells determined at step S101.

Subsequently, as same as the above-mentioned steps, at steps S103~S107, the judgment about whether the combination of the cells that can be parallel-connected is present, the setting of the cell combination for the parallel-connection of the cells, and the operation to parallel-connect the cells are performed. Then, until the cells corresponding to the number of the cells to be parallel-connected are all connected in parallel, the same operations as the above-mentioned steps S101~S107 are repeatedly performed. As a consequence, one battery module in which the desired number of the cells are parallel-connected can be obtained.

On the other hand, at step S104, when judged that the cell combination whose inrush current $I_{pq}$ is less than or equal to the upper limit current value α is not present, the routine proceeds to step S108, and at step S108, a re-selecting (or a re-sampling) of the cells for the parallel-connection is performed. That is, in the present embodiment, when judged that the cell combination whose inrush current $I_{pq}$ is less than or equal to the upper limit current value α is not present, it is judged that the combination of the cells that can be parallel-connected is not present, then an operation to sample or select n cells again is performed with the cell that cannot be parallel-connected replaced with the other cells except the cells determined at step S101. Here, as a method of re-selecting (or re-sampling) the cells, for instance, a method, in which cells except the cell that is the most used for the cell combination are re-selected, could be employed. When explaining the four cells A, B, C and D as the same example as the above, when the operation of the re-selecting is performed in the case where the cell A and the cell B are already parallel-connected, a cell that is an object of the re-selecting (or re-sampling) is selected from not the cells A and B that are the most used for the cell combination but from the cells C and D, then the selected cell is replaced with the other cells. Here, the cell that is the object of the re-selecting (or re-sampling) is not necessarily one cell, and two or more cells can be selected. In this case, as the cell that is the object of the re-selecting, one of the cells C and D could be selected, or both of the cells C and D might be selected. Further, in a case where n cells are equal to the number of the cells forming the battery module (i.e. in a case where n=m and all cells forming the battery module are parallel-connected), the above re-selecting (or re-sampling) operation can be changed to an operation in which the cell that can not be parallel-connected, which is connected to the battery module, is removed and replaced with the other cell previously prepared for the replacement by the operator.

As explained above, in the present embodiment, the operation to calculate the inrush current $I_{pq}$ of the pair of cells is performed for all the combinations of the cells determined for the parallel-connection, and the cell combination whose inrush current $I_{pq}$ is the largest in the cell combinations which are judged that the calculated inrush current $I_{pq}$ is less than or equal to the predetermined upper limit current value α (i.e. the cell combination whose difference ($α-I_{pq}$) is the minimum value) is selected and set as the cell combination to parallel-connect the cells, then the operation in which the pair of cells forming the set cell combination are parallel-connected is repeated, until the cells determined for the parallel-connection of the cells are all parallel-connected. Therefore, it is possible to parallel-connect the plurality of the cells without combining the cells between which the excessive inrush current flows also without making an unnecessary attempt to parallel-connect the cells. With this, no excessive inrush current flows when the cells are connected in parallel, and the plurality of the cells can be parallel-connected in a short time.

Further, in the present embodiment, the cell combination whose inrush current $I_{pq}$ is the largest (i.e. the cell combination whose difference ($α-I_{pq}$) is the minimum value) is set as the cell combination to parallel-connect the cells. Here, from the expression (1), although the cell combination whose inrush current $I_{pq}$ is larger has a tendency for the voltage difference ΔV between the cells to be large, by parallel-connecting the pair of cells forming the cell combination whose voltage difference ΔV is large, the voltages of the pair of cells are synthesized or joined then become a value between the both cells before being parallel-connected, which results in voltage variation of the cell converging to a center of the voltage variation. Thus, in the present embodiment, when setting the parallel-connection cell next, since the voltage variation already converges, the cell combination whose inrush current $I_{pq}$ is small increases, thereby readily selecting the combination of the cells that can be parallel-connected.

Second Embodiment

Figure 3:
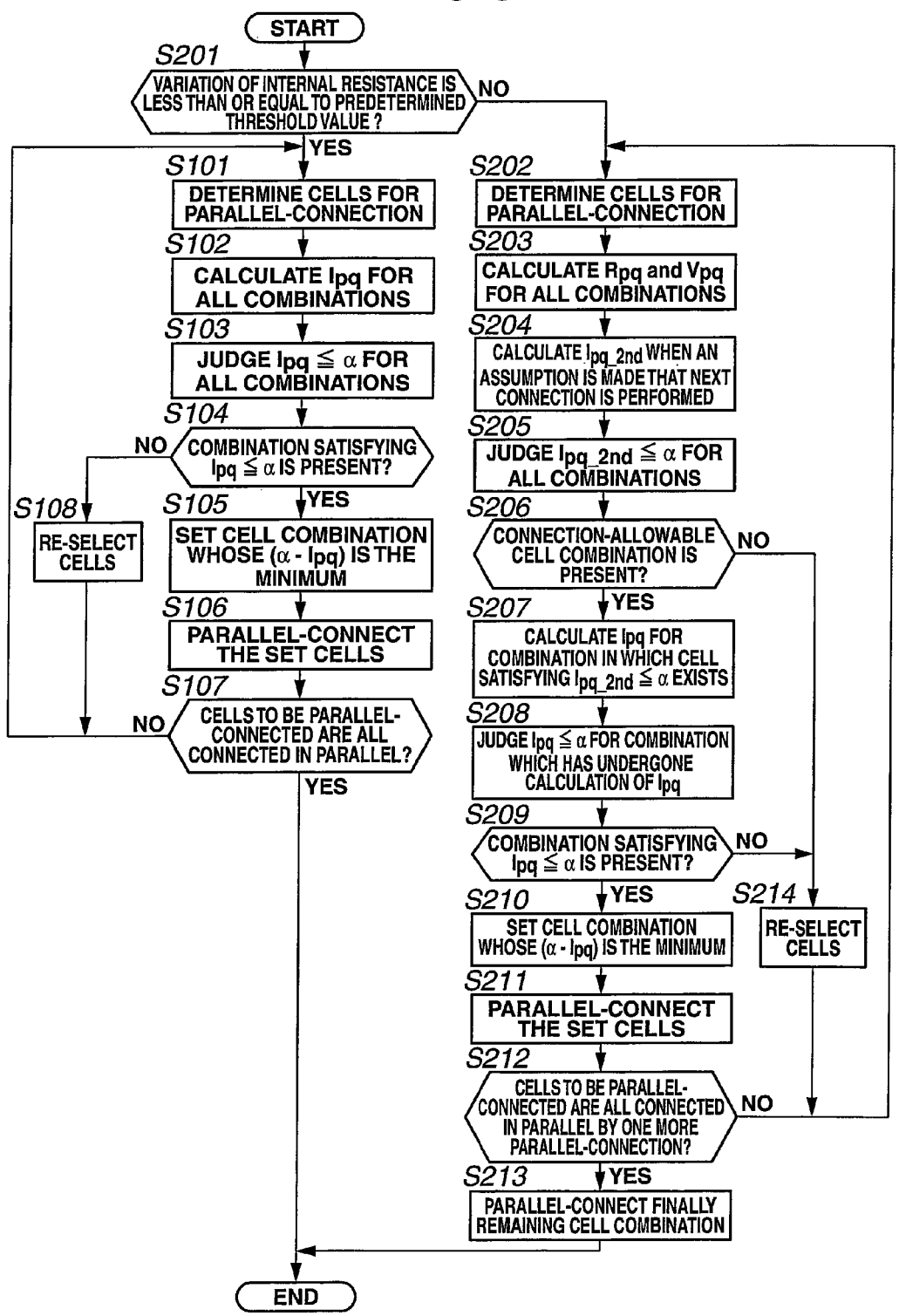
FIG. 3 is a flow chart showing a cell parallel connection method of a second embodiment.

Next, a second embodiment of the present invention will be explained. FIG. 3 is a flow chart showing the other example of the operation in which the cell combination to parallel-connect the cells is set from the plurality of cells and the set cells are parallel-connected. Regarding operation steps of the present embodiment, steps S101~S108 are the same as those of the first embodiment shown in FIG. 2. Thus, these steps in FIG. 3 are indicated by the same step numbers as those in FIG. 2, and description of their explanation mentioned above is used also in the present embodiment. Further, a configuration of the cell connection system of the present embodiment is the same as that shown in FIG. 1.

With regard to a specific method of the second embodiment which sets the cell combination to parallel-connect the cells from the plurality of cells, as same as the first embodiment, the case where the previously sampled or selected n cells (n is an arbitrary number of cells with m being an upper limit) are parallel-connected from m cells will be explained as an example.

In the present embodiment, first, at step S201, the cell connection control device 10 obtains the internal resistances of all the cells for the parallel-connection, and calculates variation of the internal resistance of the cell on the basis of the internal resistances obtained, then judges whether the variation of the internal resistance is less than or equal to a predetermined threshold value or not. Since the method of obtaining the internal resistance of the cell is the same as step S101 of the first embodiment, its explanation is omitted here. When judged that the variation of the internal resistance is less than or equal to the predetermined threshold value, the routine proceeds to step S101. On the other hand, when judged that the variation of the internal resistance is greater than the predetermined threshold value, the routine proceeds to step S202. Here, the variation of the internal resistance means a magnitude of the variation such as a difference between a maximum value and a minimum value of the internal resistance among the plurality of the cells and a maximum value and a minimum value of an average of the internal resistance among the plurality of the cells.

The reason why the judgment about whether the variation of the internal resistance is less than or equal to the predetermined threshold value or not is made is as follows. First, if values of the internal resistance of a pair of cells among the cells for the parallel-connection are $R_p$, $R_q$ and its combined resistance when parallel-connected is $R_{pq}$, the combined resistance $R_{pq}$ can be determined from an expression of $R_{pq}=R_p \cdot R_q/(R_p+R_q)$. Here, the greater the difference between $R_p$ and $R_q$, the greater the reduction width of a value of the resistance from the internal resistance $R_p$ or $R_q$ to the combined resistance $R_{pq}$ is. Because of this, when parallel-connecting the cells one after another while combining the cells from among a group of the cells having great variation of the internal resistance, the combined resistance $R_{pq}$ rapidly becomes small, and the inrush current $I_{pq}$ determined according to the expression (1) has a tendency to increase. As a result, a width of the selection when combining and parallel-connecting the cells becomes narrower.

Therefore, in the present embodiment, when judged that the variation of the internal resistance is less than or equal to the predetermined threshold value, the routine proceeds to step S101. Then, as same as the first embodiment described above, at steps S101~S108, the operation of the setting of the cell combination to parallel-connect the cells and the connecting of the cells in parallel is performed. On the other hand, when judged that the variation of the internal resistance is greater than the predetermined threshold value, it is conceivable that, by the fact that the combined resistance $R_{pq}$ rapidly becomes small depending on the parallel-connected cells, the inrush current $I_{pq}$ will increase then the width of the selection when successively parallel-connecting the cells will become narrower. Thus, in this case, the routine proceeds to step S202, and operations of steps S202~S214 described later are performed. More specifically, at steps S202~S214, a judgment is made as to whether, after parallel-connecting a pair of cells, the cell combination that allows the other cell to be further parallel-connected to the cell pair formed by parallel-connection of this pair of cells is present or not. That is, a judgment is made as to whether or not, not only the parallel-connection this time is possible, but also the cell combination allowing a next parallel-connection is present or not. This point is different from steps S101~S108. Here, the predetermined threshold value is such value of the variation of the internal resistance that the inrush current $I_{pq}$ does not become excessive in the method of the first embodiment mentioned above and also the cells to be parallel-connected can be all connected in parallel. The predetermined threshold value can be set according to the voltage and the internal resistance of the cells for the parallel-connection and/or the number of the cells to be parallel-connected. In the following description, steps S202~S214 in the flow chart of FIG. 3 will be explained.

At step S202, as same as step S101 in the first embodiment, the determination of the cells for the parallel-connection is performed, and the voltage and the internal resistance of the determined cells are obtained.

At step S203, calculation of the combined resistance $R_{pq}$ and a combined voltage $V_{pq}$ when parallel-connecting the pair of cells is performed for all the cell combinations. More specifically, the cell connection control device 10 performs the operation to calculate the combined resistance $R_{pq}$ and the combined voltage $V_{pq}$ when parallel-connecting the pair of cells, for all the combinations of the cells determined at step S202. In the present embodiment, for instance, in the case where the four cells A, B, C and D are determined at step S202, the cell connection control device 10 performs the operation to calculate the combined resistance $R_{pq}$ and the combined voltage $V_{pq}$, for six pairs of cells of A-B, A-C, A-D, B-C, B-D and C-D which are all combinations of the four cells. Here, the combined voltage $V_{pq}$ can be determined, for instance, from current voltage, current charge capacity and fully charged capacity of each cell. More specifically, first, an SOC (State of Charge) of a cell pair after the inrush current $I_{pq}$ flows between the cells when the pair of cells are parallel-connected and the cell pair is formed is calculated from the current voltage, the current charge capacity and the fully charged capacity. Then, by referring to a table showing a relationship between a predetermined SOC and the voltage, on the basis of the calculated SOC of the cell pair, the combined voltage $V_{pq}$ can be determined.

At step S204, an operation to calculate an inrush current $I_{pq\_2nd}$ when an assumption is made that, after parallel-connecting the pair of cells, the other cell is further parallel-connected to the cell pair formed by parallel-connection of this pair of cells, is performed for all the cell combinations. More specifically, the cell connection control device 10 performs the operation to calculate the inrush current $I_{pq\_2nd}$ flowing between the cells when an assumption is made that, after parallel-connecting the pair of cells forming the cell combination which has undergone the calculation of the combined resistance $R_{pq}$ and the combined voltage $V_{pq}$, one of the other cells determined at step S202 is further selected and parallel-connected to the cell pair formed by parallel-connection of this pair of cells, for all the cell combinations which have undergone the calculation of the combined resistance $R_{pq}$ and the combined voltage $V_{pq}$. When explaining the four cells A, B, C and D as the same example as the above, first, on the basis of a calculation result of the combined resistance $R_{pq}$ and the combined voltage $V_{pq}$ when the cell A and the cell B are parallel-connected and the cell pair A-B is formed, the cell connection control device 10 calculates two inrush currents $I_{pq\_2nd}$ when an assumption is made that the cell C is further parallel-connected to the cell pair A-B and when an assumption is made that the cell D is further parallel-connected to the cell pair A-B. Likewise, the inrush currents $I_{pq\_2nd}$ are calculated also for cases of the cell combinations of A-C, A-D, B-C, B-D and C-D except the cell combination A-B.

At step S205, the cell connection control device 10 judges whether the inrush current $I_{pq\_2nd}$ is less than or equal to a predetermined upper limit current value α or not, for all the cell combinations which have undergone the calculation of the inrush current $I_{pq\_2nd}$. With this, it is possible to judge whether, after parallel-connecting the pair of cells, the other cell that can be further parallel-connected to the cell pair formed by parallel-connection of this pair of cells is present or not. Here, the upper limit current value α could be set to the same value as the upper limit current value α of step S103.

At step S206, the cell connection control device 10 judges whether a cell combination, in which such other cell that the inrush current $I_{pq\_2nd}$ is less than or equal to the upper limit current value α exists, is present or not. When explaining the four cells A, B, C and D as the same example as the above, regarding two inrush currents $I_{pq\_2nd}$ when an assumption is made that, after the cell A and the cell B are parallel-connected, the cell C is further parallel-connected to the cell pair A-B and when an assumption is made that, after the cell A and the cell B are parallel-connected, the cell D is further parallel-connected to the cell pair A-B, if at least either one of the two inrush currents $I_{pq\_2nd}$ is less than or equal to the upper limit current value α, the cell combination A-B is a cell combination (hereinafter, called a "connection-allowable cell combination") in which such other cell that the inrush current $I_{pq\_2nd}$ is less than or equal to the upper limit current value α exists. Then, when judged that the connection-allowable cell combination is present, the routine proceeds to step S207. On the other hand, when judged that the connection-allowable cell combination is not present, the routine proceeds to step S214.

When judged that the connection-allowable cell combination is present at step S206, the routine proceeds to step S207, and the calculation of the inrush current $I_{pq}$ when parallel-connecting the pair of cells is performed for all the connection-allowable cell combinations. More specifically, the cell connection control device 10 calculates each inrush current $I_{pq}$ flowing when parallel-connecting the pair of cells forming the cell connection, for all the connection-allowable cell combinations.

At step S208, as same as the step S103, the cell connection control device 10 judges whether the calculated inrush current $I_{pq}$ is less than or equal to the predetermined upper limit current value α or not, for all the cell combinations which have undergone the calculation of the inrush current $I_{pq}$.

At step S209, as same as the step S104, the cell connection control device 10 judges whether the cell combination whose inrush current $I_{pq}$ is less than or equal to the predetermined upper limit current value α is present or not, for all the cell combinations which have undergone the calculation of the inrush current $I_{pq}$. Then, when judged that the cell combination whose inrush current $I_{pq}$ is less than or equal to the predetermined upper limit current value α is present, the routine proceeds to step S210. On the other hand, when judged that the cell combination whose inrush current $I_{pq}$ is less than or equal to the predetermined upper limit current value α is not present, the routine proceeds to step S214. Here, the upper limit current value α could be set to the same value as the upper limit current value α of steps S103 and S205. When explaining the four cells A, B, C and D as the same example as the above, first, in a case where the cell combination A-B and the cell combination C-D are the connection-allowable cell combinations, if at least either one of the inrush currents $I_{pq}$ upon parallel-connection of the cell A and the cell B and the inrush currents $I_{pq}$ upon parallel-connection of the cell C and the cell D is less than or equal to the upper limit current value α, it is judged that the cell combination whose inrush current $I_{pq}$ is less than or equal to the predetermined upper limit current value α is present.

When judged that the cell combination whose inrush current $I_{pq}$ is less than or equal to the predetermined upper limit current value α is present at step S209, the routine proceeds to step S210, and at step S210, as same as the step S105, calculation of a difference $(\alpha - I_{pq})$ between the upper limit current value α and the inrush current $I_{pq}$ is performed for all the cell combinations whose inrush currents $I_{pq}$ have been judged to be less than or equal to the upper limit current value α, then the cell combination whose difference $(\alpha - I_{pq})$ is the minimum value is set as the cell combination to parallel-connect the cells.

At step S211, as same as the step S106, the cell connection unit 20 receives a signal from the cell connection control device 10 then parallel-connects the pair of cells forming the cell combination for the parallel-connection set at step S210.

At step S212, the cell connection control device 10 judges whether or not a current state is a state in which the cells corresponding to the number of the cells to be parallel-connected are all connected in parallel by one more parallel-connection. That is, a judgment is made as to whether or not a current state is a state in which all the cells are parallel-connected then one battery module is formed by one more parallel-connection. When explaining the four cells A, B, C and D as the same example as the above, a state in which all the four cells are parallel-connected by one more parallel-connection is a state in which a cell-set A-B-C is formed by three of the cells A, B and C then the four cells are all parallel-connected by parallel-connecting the cell-set A-B-C and the cell D which are a finally remaining cell pair, or a cell pair (a cell-set) A-B and a cell pair (a cell-set) C-D are formed by the cells A and B and the cells C and D respectively then the four cells are all parallel-connected by parallel-connecting the cell pair (the cell-set) A-B and the cell pair (the cell-set) C-D which are a finally remaining cell pair. Then, when judged that the current state is the state in which the cells corresponding to the number of the cells to be parallel-connected are all connected in parallel by one more parallel-connection, the routine proceeds to step S213. On the other hand, when judged that the current state is not the state in which the cells corresponding to the number of the cells to be parallel-connected are all connected in parallel by one more parallel-connection, in order to further perform the operation to parallel-connect the cells, the routine returns to step S202.

When judged that the current state is not the state in which the cells corresponding to the number of the cells to be parallel-connected are all connected in parallel by one more parallel-connection at step S212, the routine returns to step S202, and the determination of the cells for the parallel-connection is performed again, and also the voltage and the internal resistance of the determined cells are obtained. Here, upon the determination of the cells, in a case where the cell pair (the cell-set) that has already been connected in parallel exists, the determination of the cells for the parallel-connection is performed with the cell pair (the cell-set) treated as one cell, then the voltage and the internal resistance of the determined cells are obtained.

Subsequently, as same as the above, at steps S203~S212, the judgment about whether, after parallel-connecting the pair of cells, the other combination of the cell that can be further parallel-connected to the cell pair formed by parallel-connection of this pair of cells is present or not, the setting of the cell combination for the parallel-connection of the cells, and the operation to parallel-connect the cells are performed. Then, until the current state is the state in which the cells corresponding to the number of the cells to be parallel-connected are all connected in parallel by one more parallel-connection, the same operations as the above-mentioned steps S202~S212 are repeatedly performed. As a consequence, one battery module in which the desired number of the cells are parallel-connected can be obtained.

Then, at step S212, when judged that the current state is the state in which the cells corresponding to the number of the cells to be parallel-connected are all connected in parallel by one more parallel-connection, the routine proceeds to step S213, and at step S213, the finally remaining pair of cells are parallel-connected. More specifically, the cell connection control device 10 sends a signal to the cell connection unit 20 so as to parallel-connect the finally remaining pair of cells. The cell connection unit 20 receives the signal, and connects the finally remaining pair of cells in parallel. In the present embodiment, with this operation, since the cells are all parallel-connected, an operation to finish the cell connection control is performed, and the present operation is terminated.

On the other hand, when judged that the connection-allowable cell combination is not present at step S206, the routine proceeds to step S214, and at step S214, a re-selecting (or a re-sampling) of the cells for the parallel-connection is performed. The re-selecting (or the re-sampling) of the cells performed here could be the same operation as the re-selecting (or the re-sampling) of the cells performed at step S108. Further, also when judged that the cell combination whose inrush current $I_{pq}$ is less than or equal to the upper limit current value α is not present at step S209, as same as the above, the routine proceeds to step S214, and the re-selecting (or the re-sampling) of the cells for the parallel-connection is performed.

As explained above, in the second embodiment, the internal resistances of all the cells are calculated, and when judged that the variation of the internal resistance is greater than the predetermined threshold value, the operation to calculate the combined resistance and the combined voltage when selecting and parallel-connecting the pair of cells is performed for all the combinations of the cells determined for the parallel-connection. Subsequently, the judgment is made as to whether, when the assumption is made that, after parallel-connecting the pair of cells forming the cell combination, the other cell is further parallel-connected to this cell pair (this cell-set), the connection-allowable cell combination, in which such other cell that the inrush current $I_{pq\_2nd}$ flowing between the cells is less than or equal to the predetermined upper limit current value α exists, is present or not, for all the cell combinations which have undergone the calculation of the combined resistance and the combined voltage. Then, the cell combination for the parallel-connection is set from such connection-allowable cell combinations, and the pair of cells forming the set cell combination are parallel-connected.

Therefore, according to the second embodiment, in addition to the effects of the first embodiment described above, the following effects can be obtained. That is, according to the second embodiment, by judging the magnitude of the variation of the internal resistance, it is possible to judge whether or not a group of the cells determined as the cell for the parallel-connection is a cell group whose cell can be relatively-easily successively parallel-connected. Then, when the variation of the internal resistance is less than or equal to the predetermined threshold value, as same as the first embodiment, the judgment is made as to whether the combination of the cells that can be parallel-connected is present or not. On the other hand, when the variation of the internal resistance is greater than the predetermined threshold value, the judgment is made as to whether, after parallel-connecting the pair of cells, the cell combination, in which the other cell that can be further parallel-connected to the cell pair formed by parallel-connection of this pair of cells exists, is present or not. Thus, this decreases time and effort to re-start to select the cell, which is caused by the fact that, after the cells are actually parallel-connected, a cell that can be successively parallel-connected does not exist. It is therefore possible to parallel-connect the plurality of cells in an even shorter time.

Third Embodiment

Figure 4:
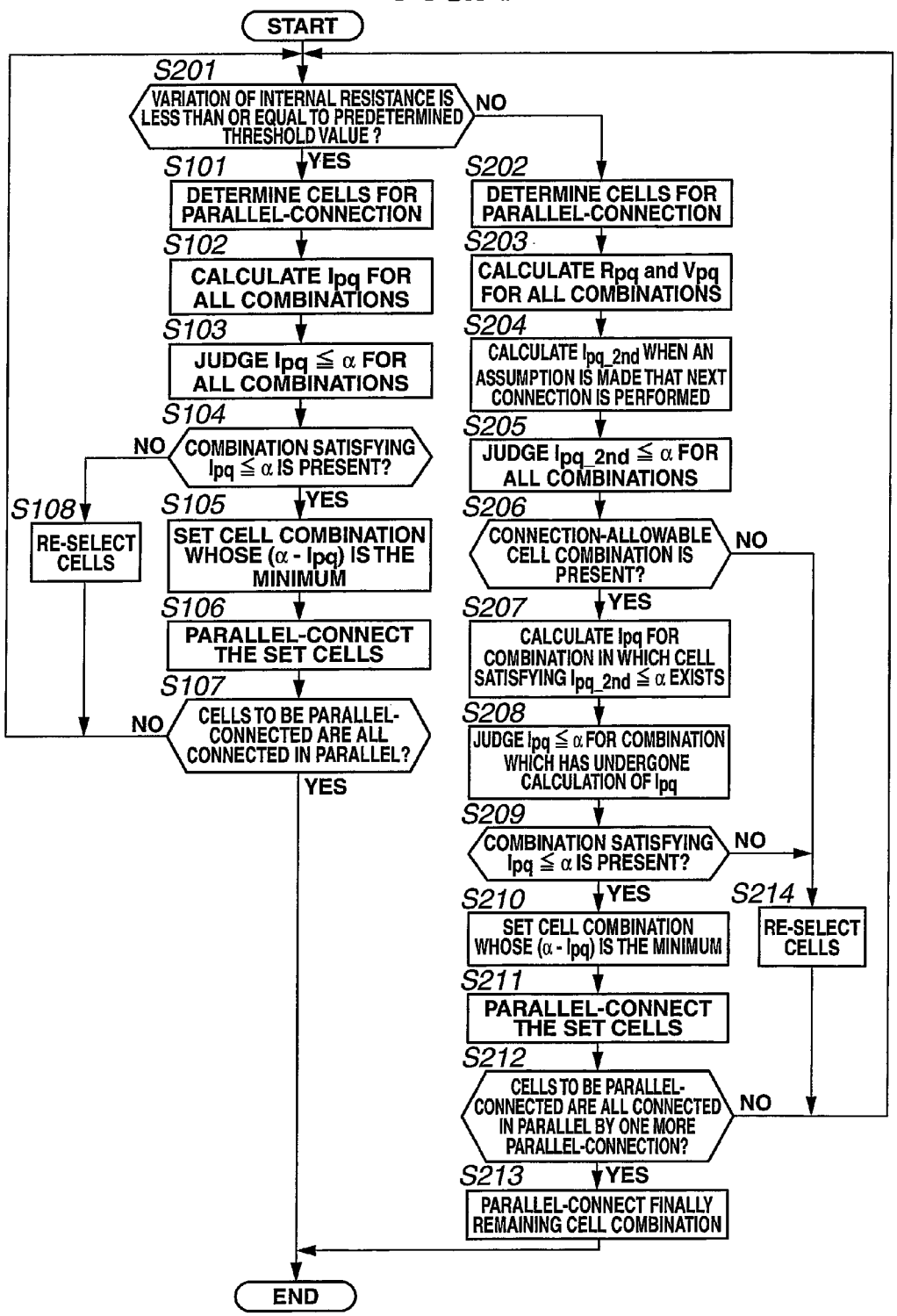
FIG. 4 is a flow chart showing a cell parallel connection method of a third embodiment.

Next, a third embodiment of the present invention will be explained. The third embodiment is an embodiment obtained by modifying the second embodiment. FIG. 4 is a flow chart of the third embodiment, showing an operation in which the cell combination to parallel-connect the cells is set from the plurality of cells and the set cells are parallel-connected. In the present embodiment, the cell combination to parallel-connect the cells is set, and after parallel-connecting the pair of cells forming the set cell combination, the routine returns to step S201, then the magnitude of the variation of the internal resistance of the cell is judged again. This point is different as compared with the second embodiment.

By this operation, in the present embodiment, the cell combination to parallel-connect the cells is set, and after parallel-connecting the pair of cells forming the set cell combination, a judgment is made again as to whether or not the variation of the internal resistance of the cell is less than or equal to the predetermined threshold value. For instance, when judged that the variation of the internal resistance is greater than the predetermined threshold value, the routine proceeds to step S202. Then, as same as the above second embodiment, at steps S202~S214, the operation to parallel-connect the cells is performed. However, after parallel-connecting the cells, the magnitude of the variation of the internal resistance is judged again, then when judged that the variation of the internal resistance is less than or equal to the predetermined threshold value, this time the routine proceeds to step S101, and as same as the above first embodiment, at steps S101~S108, the operation to parallel-connect the cells is performed.

Therefore, according to the third embodiment, in addition to the effects of the second embodiment described above, the following effects can be obtained. That is, by making the judgment of the magnitude of the variation of the internal resistance of the cell each time the parallel-connection of the cell is carried out, even if the routine once proceeds to step S202 by the fact that the variation of the internal resistance is great then the cells are parallel-connected at steps S202~S212, by making the judgment of the magnitude of the variation of the internal resistance of the cell again, when the variation of the internal resistance becomes less than or equal to the predetermined threshold value, the cells can be parallel-connected through the operation of steps S101~S107 which is a simpler procedure.

Fourth Embodiment

Figure 5:
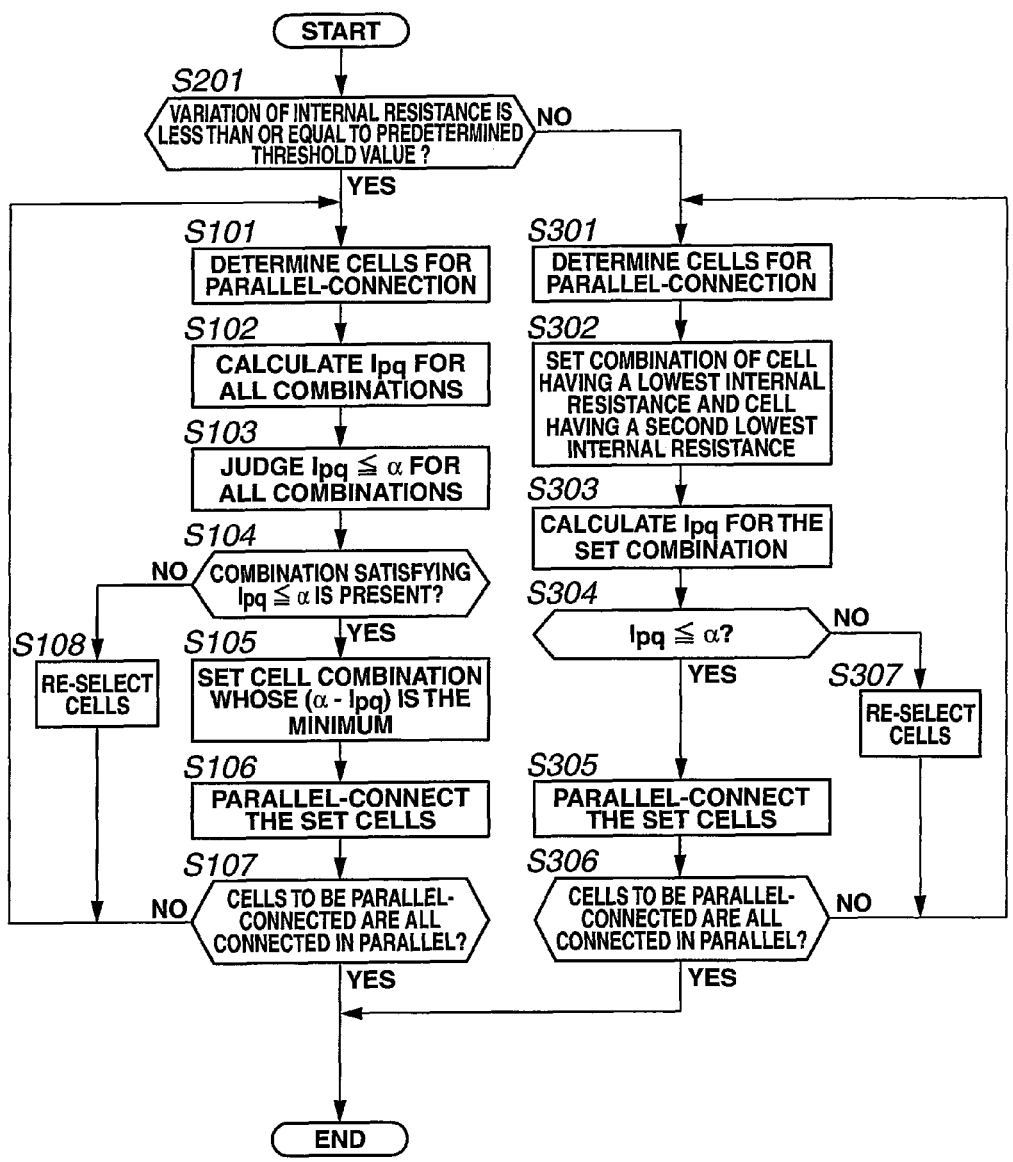
FIG. 5 is a flow chart showing a cell parallel connection method of a fourth embodiment.

Next, a fourth embodiment of the present invention will be explained. FIG. 5 is a flow chart showing the other example of the operation in which the cell combination to parallel-connect the cells is set from the plurality of cells and a pair of cells forming the set cell combination are parallel-connected. As compared with the steps of the first embodiment shown in FIG. 2, operations of steps S101~S108 in the present embodiment are the same. Further, as compared with the steps of the second and third embodiments shown in FIGS. 3 and 4, an operation of step S201 is the same. Thus, these steps in FIG. 5 are indicated by the same step numbers as those in FIGS. 2, 3 and 4, and description of their explanation mentioned above is used also in the present embodiment. Further, a configuration of the cell connection system of the present embodiment is the same as that shown in FIG. 1.

With regard to a specific method of the fourth embodiment which sets the cell combination to parallel-connect the cells from the plurality of cells, as same as the first embodiment, the case where the previously sampled or selected n cells are parallel-connected will be explained as an example.

In the present embodiment, as same as the second embodiment described above, first, at step S201, the magnitude of the variation of the internal resistance is judged. Next, at steps S101~S108 and at steps S301~S307, the operation of the setting of the cell combination to parallel-connect the cells and the connecting of the set cells in parallel is performed.

At step S201, as same as the second embodiment described above, the cell connection control device 10 obtains the internal resistances of all the cells for the parallel-connection, and calculates variation of the internal resistance of the cell according to the internal resistances obtained, then judges whether the variation of the internal resistance is less than or equal to a predetermined threshold value or not. When judged that the variation of the internal resistance is less than or equal to the predetermined threshold value, the routine proceeds to step S101. On the other hand, when judged that the variation of the internal resistance is greater than the predetermined threshold value, the routine proceeds to step S301. In the following description, steps S301~S307 in the flowchart shown in FIG. 5 will be explained.

At step S301, as same as step S101, the determination of the cells for the parallel-connection is performed, and also the voltage and the internal resistance of the determined cells are obtained.

At step S302, the cell connection control device 10 selects a cell having a lowest internal resistance and a cell having a second lowest internal resistance from the cells which have undergone the calculation of the internal resistance at step S301, and sets the selected pair of cells as the cells for the parallel-connection. This reason is as follows. If each internal resistance of the pair of cells to be parallel-connected is low, the combined resistance $R_{pq}$ after parallel-connection becomes low, then the inrush current $I_{pq}$ determined according to the expression (1) has a tendency to increase. Thus, by parallel-connecting the cells from the cell having the low internal resistance in preference to the other cells, cells which have a high internal resistance and have a tendency for the inrush current $I_{pq}$ upon the parallel-connection to decrease are left as a cell that is later parallel-connected, then it is possible to select the cell for the parallel-connection more easily when successively parallel-connecting the plurality of cells.

At step S303, the cell connection control device 10 calculates the inrush current $I_{pq}$ flowing when the pair of cells set at step S302 are parallel-connected.

At step S304, the cell connection control device 10 judges whether the calculated inrush current $I_{pq}$ is less than or equal to the upper limit current value α or not. When judged that the inrush current $I_{pq}$ is less than or equal to the upper limit current value α, this set pair of cells are judged that the parallel-connection is possible, then the routine proceeds to step S305. On the other hand, when judged that the inrush current $I_{pq}$ is greater than the upper limit current value α, this set pair of cells are judged that the parallel-connection is not possible, then the routine proceeds to step S307.

When judged that the inrush current $I_{pq}$ is less than or equal to the upper limit current value α at step S304, the routine proceeds to step S305, and at step S305, as same as step S106, the cell connection unit 20 receives a signal from the cell connection control device 10 then parallel-connects the pair of cells set at step S302.

At step S306, as same as step S107, the cell connection control device 10 judges whether or not the cells corresponding to the number of the cells to be parallel-connected are all connected in parallel. When judged that the cells to be parallel-connected are not all connected in parallel, in order to perform an operation to further parallel-connect the cells, the routine returns to step S301. On the other hand, when judged that the cells to be parallel-connected are all connected in parallel, an operation to finish the cell connection control is performed, and the present operation is terminated.

When judged that the cells to be parallel-connected are not all connected in parallel at step S306, the routine returns to step S301. Then, at steps S301~S306, the cell having a lowest internal resistance and the cell having a second lowest internal resistance are set again as the cell combination for the parallel-connection, and the operation to parallel-connect the cells is performed. Then, until the cells corresponding to the number of the cells to be parallel-connected are all connected in parallel, the same operations as steps S301~S306 are repeatedly performed. As a consequence, one battery module in which the desired number of the cells are parallel-connected can be obtained.

On the other hand, when judged that the inrush current $I_{pq}$ is greater than the upper limit current value α at step S304, the routine proceeds to step S307, and at step S307, the cell connection control device 10 performs the re-selecting (or the re-sampling) of the cells. The re-selecting (or the re-sampling) of the cells performed here could be the same operation as the re-selecting (or the re-sampling) of the cells performed at step S108.

As explained above, in the fourth embodiment, the internal resistances of all the cells are calculated, and when judged that the variation of the internal resistance is greater than the predetermined threshold value, the cell having the lowest internal resistance and the cell having the second lowest internal resistance are set as the cells for the parallel-connection, then when judged that the inrush current $I_{pq}$ of the set pair of cells is less than or equal to the predetermined upper limit current value α, the pair of cells forming the set cell combination are parallel-connected.

Therefore, according to the fourth embodiment, in addition to the effects of the first embodiment described above, the following effects can be obtained. That is, even in a case where the inrush current $I_{pq}$ has the tendency to increase because of the great variation of the internal resistance of the cell group and the width of the selection when combining and parallel-connecting the cells becomes narrower, by parallel-connecting the cells having the tendency for the inrush current $I_{pq}$ to increase in preference to the other cells, it is possible to leave the cells which have the high internal resistance and have the tendency for the inrush current $I_{pq}$ to decrease, as the cell that is later parallel-connected. Thus, this decreases time and effort to re-start to select the cell, which is caused by the fact that, after the cells are actually parallel-connected, a cell that can be successively parallel-connected does not exist. It is therefore possible to parallel-connect the plurality of cells in an even shorter time. Further, in the fourth embodiment, as same as the third embodiment, a configuration, in which the cell combination to parallel-connect the cells is set, and after parallel-connecting the pair of cells forming the set cell combination, a judgment is made again as to whether or not the variation of the internal resistance of the cell is less than or equal to the predetermined threshold value, could be employed.

Here, in the embodiments described above, the cell connection control device 10 corresponds to a determining unit or means, an inrush current calculating unit or means, a judging unit or means, a connection cell setting unit or means, an internal resistance obtaining unit or means, an internal resistance variation judging unit or means, a combined resistance/combined voltage calculating unit or means, and a connection-allowable cell combination selecting (or sampling) unit or means, of the present invention.

Although the embodiment of the present invention has been explained above, the embodiment is described in order to facilitate an understanding of the present invention, and is not described to limit the present invention. Thus, each element or component disclosed in the above embodiment includes all design modifications and equivalents belonging to the technical scope of the present invention.

For instance, the embodiment described above show as the example that, in the case where n cells are going to be parallel-connected, the number of the previously selected or sampled cells is n that is same as the number of the parallel-connection cells. However, the number of the previously selected or sampled cells is not limited to this example, and cells that are more than the number of the parallel-connection cells can be selected or sampled. For example, in the case where n cells are going to be parallel-connected, the number of the previously selected or sampled cells could be the number that is greater than n that is the number of the parallel-connection cells. That is, the cells that are more than n are selected or sampled and successively parallel-connected, then the parallel-connection could be ended at a time when the number of the parallel-connection has reach n.

Further, in the second and third embodiments, the judgment is made as to whether the inrush current $I_{pq\_2nd}$ is less than or equal to the upper limit current value α or not, and after that, the judgment is made as to whether the inrush current $I_{pq}$ is less than or equal to the predetermined upper limit current value α or not. However, a configuration, in which after the judgment is made as to whether the inrush current $I_{pq}$ is less than or equal to the predetermined upper limit current value α or not, the judgment is made as to whether the inrush current $I_{pq\_2nd}$ is less than or equal to the upper limit current value α or not, is also possible.

The invention claimed is:

1. A cell connection control device that sets a combination of cells when parallel-connecting a plurality of cells, comprising:
    a determining unit that determines a plurality of cells for parallel-connection of the cells;
    an inrush current calculating unit that performs an operation to select a pair of cells from the cells determined by the determining unit and to calculate an inrush current flowing between the selected pair of cells when parallel-connected, for all combinations of the determined cells;
    a judging unit that judges whether the inrush current calculated by the inrush current calculating unit is less than or equal to a predetermined upper limit current value or not, for all cell combinations which have undergone the calculation of the inrush current; and
    a connection cell setting unit that sets, as a cell combination to parallel-connect the cells, a cell combination whose inrush current is the largest in the cell combinations which are judged that the inrush current is less than or equal to the upper limit current value by the judging unit.

2. The cell connection control device as claimed in claim 1, further comprising:
    an internal resistance obtaining unit that obtains internal resistances of the plurality of cells determined by the determining unit; and
    an internal resistance variation judging unit that calculates variation of the internal resistance on the basis of the internal resistances of the plurality of cells determined by the determining unit and judges whether the variation of the internal resistance is less than or equal to a predetermined threshold value or not,
    and wherein
    when judged that the variation of the internal resistance is less than or equal to the threshold value by the internal resistance variation judging unit, the connection cell setting unit sets, as the cell combination to parallel-connect the cells, a cell combination whose inrush current is the largest in the cell combinations which are judged that the inrush current is less than or equal to the upper limit current value by the judging unit.

3. The cell connection control device as claimed in claim 2, further comprising:
    a combined resistance/combined voltage calculating unit that performs an operation to select a pair of cells from the cells determined by the determining unit and to calculate a combined resistance and a combined voltage of the pair of cells when parallel-connected, for all combinations of the determined cells; and
    a connection-allowable cell combination selecting unit that judges whether, when an assumption is made that, after parallel-connecting the pair of cells forming the cell combination, the other cell determined by the determining unit is further parallel-connected, such other cell that the inrush current flowing between the cells is less than or equal to a predetermined value is present or not, and selects a combination of the cell having been judged to be present as a connection-allowable cell combination, for all the cell combinations which have undergone the calculation of the combined resistance and the combined voltage,
    and wherein
    when judged that the variation of the internal resistance is greater than the threshold value by the internal resistance variation judging unit, the connection cell setting unit sets a cell combination to parallel-connect the cells from the connection-allowable cell combinations selected by the connection-allowable cell combination selecting unit.

4. The cell connection control device as claimed in claim 2, wherein:
    when judged that the variation of the internal resistance is greater than the threshold value by the internal resistance variation judging unit, the connection cell setting unit sets, as the cell combination to parallel-connect the cells, a cell having a lowest internal resistance and a cell having a second lowest internal resistance in the cells determined by the determining unit.

5. A cell connection system comprising:
    a cell connection control device that sets a combination of cells when parallel-connecting a plurality of cells, the cell connection control device having:
        a determining unit that determines a plurality of cells for parallel-connection of the cells;
        an inrush current calculating unit that performs an operation to select a pair of cells from the cells determined by the determining unit and to calculate an inrush current flowing between the selected pair of cells when parallel-connected, for all combinations of the determined cells;
        a judging unit that judges whether the inrush current calculated by the inrush current calculating unit is less than or equal to a predetermined upper limit current value or not, for all cell combinations which have undergone the calculation of the inrush current; and
        a connection cell setting unit that sets, as a cell combination to parallel-connect the cells, a cell combination whose inrush current is the largest in the cell combinations which are judged that the inrush current is less than or equal to the upper limit current value by the judging unit; and
    a cell connection device that parallel-connects the cells on the basis of the cell combination set by the cell connection control device.

6. The cell connection system as claimed in claim 5, wherein:
    the cell connection control device further has:
    an internal resistance obtaining unit that obtains internal resistances of the plurality of cells determined by the determining unit; and
    an internal resistance variation judging unit that calculates variation of the internal resistance on the basis of the internal resistances of the plurality of cells determined by the determining unit and judges whether the variation of the internal resistance is less than or equal to a predetermined threshold value or not, and wherein when judged that the variation of the internal resistance is less than or equal to the threshold value by the internal resistance variation judging unit, the connection cell setting unit sets, as the cell combination to parallel-connect the cells, a cell combination whose inrush current is the largest in the cell combinations which are judged that the inrush current is less than or equal to the upper limit current value by the judging unit.

7. The cell connection system as claimed in claim 6, wherein:

the cell connection control device further has:

a combined resistance/combined voltage calculating unit that performs an operation to select a pair of cells from the cells determined by the determining unit and to calculate a combined resistance and a combined voltage of the pair of cells when parallel-connected, for all combinations of the determined cells; and a connection-allowable cell combination selecting unit that judges whether, when an assumption is made that, after parallel-connecting the pair of cells forming the cell combination, the other cell determined by the determining unit is further parallel-connected, such other cell that the inrush current flowing between the cells is less than or equal to a predetermined value is present or not, and selects a combination of the cell having been judged to be present as a connection-allowable cell combination, for all the cell combinations which have undergone the calculation of the combined resistance and the combined voltage, and wherein when judged that the variation of the internal resistance is greater than the threshold value by the internal resistance variation judging unit, the connection cell setting unit sets a cell combination to parallel-connect the cells from the connection-allowable cell combinations selected by the connection-allowable cell combination selecting unit.

8. The cell connection system as claimed in claim 6, wherein:

when judged that the variation of the internal resistance is greater than the threshold value by the internal resistance variation judging unit, the connection cell setting unit sets, as the cell combination to parallel-connect the cells, a cell having a lowest internal resistance and a cell having a second lowest internal resistance in the cells determined by the determining unit.

\* \* \* \* \*